United States Patent Office.

ALBERT KNIGHT AND GEORGE W. TALBOT, OF PROVIDENCE, RHODE ISLAND, ASSIGNEES OF GEORGE W. TALBOT.

*Letters Patent No.* 99,496, *dated February* 1, 1870; *reissue No.* 4,023, *dated June* 7, 1870.

IMPROVEMENT IN DYE FOR COLORING WOOL AND OTHER FIBROUS MATERIALS.

The Schedule referred to in these Letters Patent and making part of the same.

*To all whom it may concern:*

Be it known that GEORGE W. TALBOT, of the city and county of Providence, in the State of Rhode Island, did invent a new and Improved "Dye for Coloring Wool and other fibrous material;" and it is hereby declared that the following specification is a full, clear, and exact description thereof.

The object of his invention is to produce dyes for coloring which, from the combination of ingredients employed, shall be capable of giving to the fabric or yarn upon which it is used, a richness and a strength of color hitherto unequaled, and consists in the combination of foreign dyes with the domestic extracts, as hereinafter described and claimed.

The term "foreign dyes" is used in this specification, not in any geographical sense, but as expressive of a class of dyes which is obtained from woods in common use among dyers, and are indigenous to intertropical regions. Such, for example, as fustic, camwood, madder, nut-galls, sumach, hypernic, Brazilwood, weld, bar-wood, log-wood, and red-sanders. Such woods are rich in coloring-matter, but are deficient in that peculiar constituent of tannic-acid which is found in extracts obtained from domestic barks, woods, and plants, and which it is the purpose of my combination to supply.

The term "domestic extracts" is used in this specication, not in any geographical sense, but as expressive of a class of extracts which is obtained from woods, barks, and plants principally indigenous to temperate regions, and which, in comparison with the class of woods above-mentioned, are poor in coloring-matter, but are rich in the constituent of a tannic-acid of peculiar properties. Hemlock, oaks, beech, maple, butternut, &c., indicate some of the woods referred to.

It is well understood that extracts made from domestic barks, woods, and plants, possess such astringent properties as to render them incapable of being used advantageously alone in the coloring of any woolen fiber which is to be afterward manufactured into fabric or yarn.

The chief difficulty experienced in the use of foreign dyes is the want of sufficient astringent qualities to render the colors permanent, and prevent their running into each other during what is known as the "milling" process, which gives the strength of the color a severe test, and also to withstand exposure to the weather and sun.

It is also well understood that in fabrics colored with the foreign dyes exclusively, especially where high and dark shades are blended in the same piece, the light shades or threads present a smutty or dirty appearance. This results from the insufficient permanence of the dark colors, which, being too severely tested for their strength by the milling process, run into the lighter ones.

By combining the foreign dyes with the domestic extracts, a coloring is produced possessing less astringent power than the domestic extracts alone, and of more permanence than the foreign dyes.

Thus, there is given to each a portion of the qualities appertaining to the other, the result of such combination being, not only a new article of manufacture, superior to anything now in use for the purpose, but also one which can be furnished at a price reduced in proportion to the amount of domestic extracts used.

Taking into consideration the number of foreign dyes, and the number of domestic extracts it would be impossible to set forth in this specification all the different combinations that would be required to produce the different colors; one, therefore, only is decribed as the principles therein involved, and the invention shown will be the same in any and all the combinations of which the dyes and extracts are capable.

Such invention, being understood to reside in the discovery that tannic-acid of the character yielded by the kinds of woods and barks before-mentioned, can be combined with the coloring-matters of foreign dye-woods, and essentially modify the dye by adding strength and depth of tone to it without injury to its coloring principle.

To color dark brown, the dye is produced by the following combination:

Two hundred and eighty pounds of wool prepared with five and a half pounds chrome, and two and a half pounds argal. Then use twenty-five pounds fustic, twenty-four pounds hemlock, and thirty pounds cam-wood, and sadden with one and a half pound blue vitrol, and two and a half pounds copperas.

The result is a dye which possesses peculiar and distinctive properties, as evidenced by the appearance of wool or other fibrous material treated with it. Such material exhibits a depth of tone, and has a permanence of color which the employment of foreign dyes alone could not give.

It is also rendered soft and pliable, which is of great advantage in the subsequent process of carding, spinning, and weaving.

The invention is not for the particular formula above set forth, the same being given only for the purpose of showing the practical use of the domestic extracts with the foreign dyes in a single instance. Neither would it be possible to confine the invention to any particuliar formula, as each and every color or shade would require a dye composed of ingredients, in such quantities, and having such relative proportions as, according to well-established principles and experiments, are known to be necessary to produce the desired color.

What is claimed as the invention and is desired to be secured by Letters Patent, is—

An improved dye for coloring, produced by the combination of tannic-acid, of the character of that obtained from domestic barks, woods, or plants hereinbefore mentioned, with dyes obtained from woods, such as fustic, cam-wood, madder, nut-galls, sumach, hypenic, Brazil-wood, weld, bar-wood, log-wood, and red-sanders.

ALBERT KNIGHT.
GEO. W. TALBOT.

Witnesses:
W. B. VINCENT,
JOHN D. W. TAYLOR.